Feb. 21, 1956 S. E. SPIVEY 2,735,531
ATTACHMENT FOR FLOUR SIFTER
Filed Nov. 3, 1951
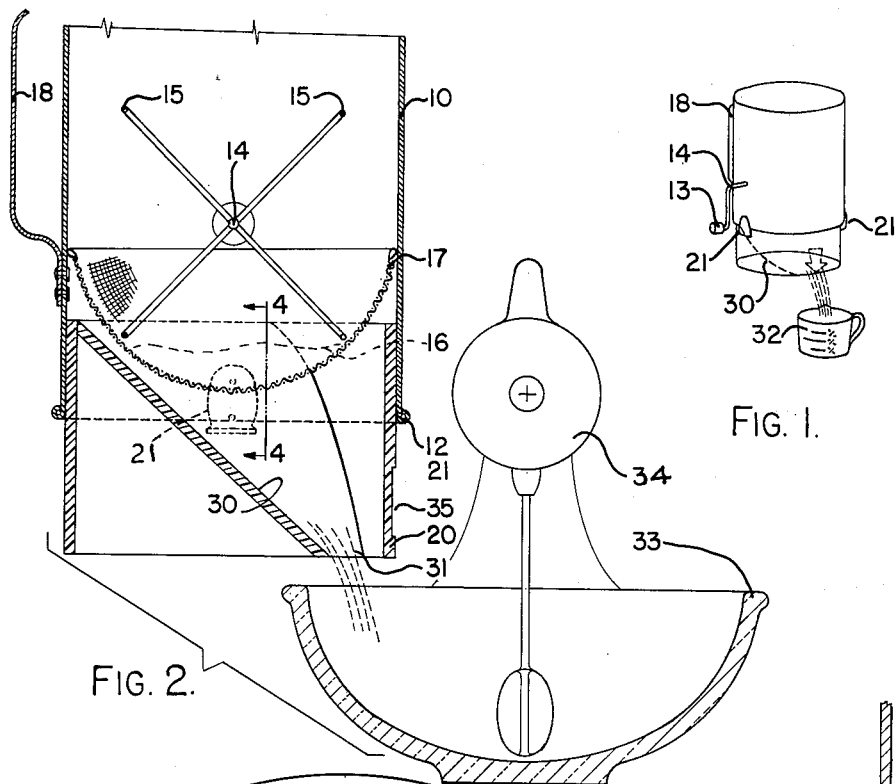
FIG. 1.
FIG. 2.
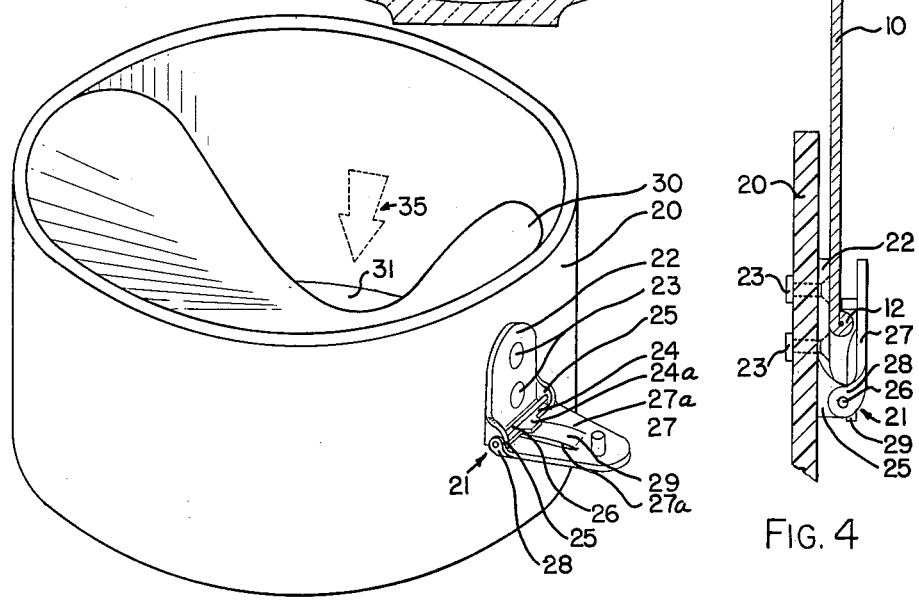
FIG. 3.
FIG. 4
INVENTOR:
SYLVIA E. SPIVEY
BY
Leslie M. Hansen
Her Attorney.

United States Patent Office 2,735,531
Patented Feb. 21, 1956

2,735,531
ATTACHMENT FOR FLOUR SIFTER
Sylvia E. Spivey, San Jose, Calif.

Application November 3, 1951, Serial No. 254,713

1 Claim. (Cl. 193—2)

The present invention relates to flour sifters, and pertains more particularly to an arrangement which will provide a steady support for a flour sifter with which it is used, and which will permit directing the flour discharged by the sifter in a concentrated stream toward a desired marginal zone of the device.

While flour sifters have remained generally unchanged for almost half a century, their use with modern mechanical kitchen equipment is sometimes awkward, since it frequently is desirable to introduce a stream of flour into a cup, or into a bowl having an electric mixer or other appliance operating therein.

In the past, there have been provided arrangements for narrowing the stream of flour discharged by a flour sifter, but such devices, if arranged to discharge at one side of the sifter, did not provide suitable support for the assembled sifter and attachment. Furthermore, in such prior devices the sifter was not available for ready use without the stream restricting feature.

The present invention contemplates the provision of an improved attachment for flour sifters which will facilitate the feeding of a stream of sifted flour at a predetermined restricted zone. It is also an object of the invention to provide means for diverting the flour discharged by a flour sifter into a concentrated stream discharging at a marginal zone of the sifter.

The invention has for a further object the provision of a device which may be easily attached to or removed from a flour sifter, and when attached thereto will visually indicate a marginal zone at which a restricted stream of flour will be discharged.

These and other objects and advantages of the invention will be apparent from the following description and the accompanying drawings, wherein:

Fig. 1 is a view in perspective of a flour sifter having an attachment thereon embodying the present invention as it would appear when discharging a stream of flour into a measuring cup.

Fig. 2 is an enlarged longitudinal sectional view through the sifter and attachment shown in Fig. 1, as it would appear when discharging a stream of flour into the bowl of an electrical mixer.

Fig. 3 is a further enlarged perspective view of the attachment as it appears when removed from the sifter, the attaching clasps being open.

Fig. 4 is a still further enlarged sectional view taken along line 4—4 of Fig. 2, the clasp being closed.

Referring to the details of the illustrated embodiment of the invention, a conventional flour sifter A, comprises a usual light weight, sheet metal, cylindrical body portion 10, with rolled upper and lower edges 11 and 12 respectively. A sifting crank 13 has the shaft portion 14 thereof journaled to extend diametrically across the cylindrical body portion 10. A pair of circular agitator rotor wires 15, 15 are secured to the crank 13 to rotate therewith. The rotor wires 15, 15 are constructed and arranged to wipe across the inner face of a usual hemispherical sifter screen 17, which is fitted into the lower end of the cylindrical body portion 10 to lie wholly above the lower end thereof to support a supply of flour 16 in the sifter. A usual support handle 18 is secured to one side of the sifter body 10.

The attachment B embodying the present invention comprises a cylindrical body portion 20 of a diameter to fit telescopically onto the lower end of the cylindrical sifter body portion 10. The attachment body portion 20 preferably is of clear transparent material such as sheet plastic. Since a number of suitable plastics are available for this purpose, and since such plastics are well known to those familiar with the art, it will not be necessary to specify any particular plastic material for this purpose.

A pair of clasps 21, 21 are mounted at diametrically opposite points on the exterior of the cylindrical attachment body portion 20. The clasps are spaced downwardly from the upper rim of the attachment body portion 20 to permit it to be telescoped onto the sifter body portion 10 for a sufficient distance to prevent undue lateral tilting of the sifter relative to the attachment.

Each attaching clip 21 comprises a mounting bracket portion 22 secured as by rivets 23 to the attachment body portion 20. A flange 24 is bent outwardly from the lower end of the bracket portion 22, and has a central abutment 24a extending outwardly therefrom. Ears 25, 25 are formed one on each side of the flange 24 and are bent outwardly at right angles to the lower end of the bracket 22. A pivot pin 26 is inserted through holes in the ears 25, 25 and pivotally supports a clasp member 27 by means of similar ears 28, 28. A spring finger 29 is severed from the body of the clasp member 27 by slits 27a, and is bent inwardly from the remainder of the clasp member 27 to bear against the abutment 24a.

The lower end of the spring finger of the clasp passes from one side of dead center on the abutment 24a to the other with respect to the pressure exerted thereon by the spring finger 29 as the clasp portion 27 is swung from open, or releasing position (Fig. 3), to its closed or clasping position (Figs. 1 and 4).

A curved flour deflecting plate 30 is formed as shown in Figs. 1, 2 and 3 with its marginal edge curved to fit within the cylindrical attachment body portion 20 and to have all portions of the deflector plate 30 slope toward an opening 31 at one side of the cylindrical body portion 20. The deflector plate 30 preferably is of clear plastic and defines substantially an inverted truncated conic section within the cylindrical attachment body portion 20. The conic axis of the deflector plate 30 is located adjacent a side of the attachment body member 20, and the truncated lower edge thereof is spaced from the cylindrical body portion 20 to provide a small marginal discharge opening between the plate 30 and the body 20 of the attachment B. If made of plastic material, the deflector plate 30 may be molded integrally with the attachment body portion 20 or attached thereto by an adhesive suitable for joining plastics. Since such adhesives are well known it will be unnecessary to specify any particular one for the purpose. If made of sheet metal, the parts may be joined in accordance with well known practice as by solder or rivets, not shown.

In using the invention the attachment B may be placed on a work surface such as a cabinet top or table, not shown, with the clasps 21, 21 open. The flour sifter A also is placed on the work surface, together with such other equipment and ingredients as may be needed for the making of a desired product. The flour sifter A frequently will be used without the attachment B, as for example, in dusting flour over a work surface upon which dough is to be kneaded or rolled. In such case, a wide dispersion of the sifted flour is desired. Should it be necessary, however, to sift flour into a measuring cup 32

(Fig. 1) or into a mixing bowl 33 in which an electric mixer 34 is operating, the sifter A may be fitted onto the upper end of the attachment B, and the clasp arms 28, 28 swung upwardly to fasten over the lower rim 12 of the sifter body 10 (Fig. 4). The assembled sifter and attachment then are ready for use.

With the attachment constructed or clear plastic the position of the deflector plate and of the discharge opening 31 therein is visible in any rotative position of the attachment B on the sifter A. However, if it should be desired to make the attachment B of opaque material, such as metal, I prefer to indicate the position of the discharge zone on the exterior surface of the cylindrical attachment body portion 20. This may be accomplished by painting or embossing an arrow 35 or other suitable marking indicia externally adjacent the deflector plate discharge opening 31.

The device provides a firm and stable support for the sifter when attached thereto, and may be readily and quickly removed or attached to meet the changing requirements of the task at hand.

While I have illustrated and described a preferred embodiment of my present invention it will be understood however that various changes and modifications may be made in the details thereof without departing from the spirit and scope of the invention as set forth in the appended claims.

Having thus described the invention, what I claim as new, and desire to protect by Letters Patent is defined in the following claim.

An attachment for a hand flour sifter having a rigid cylindrical tubular body portion with a sifting screen mounted transversely across said body portion and spaced upwardly from the lower end thereof, an agitator being mounted for movement above said screen with means for actuating said agitator; said attachment comprising a rigid cylindrical tubular body portion of a diameter to fit telescopically on the lower end of said sifter body to be co-extensive therewith, and a rigid, smooth, deflector plate of inverted, truncated, conical section joined marginally except at its truncated apex portion, and mounted transversely of said attachment body portion with the conic axis of said deflector plate disposed parallel to and adjacent one side of the attachment body portion, the truncation of said deflector plate providing a small discharge opening between the cylindrical wall of the attachment and the truncated lower edge of the deflector plate, the slope of the conical deflector plate being such as to cause flour falling thereon from the sifter to gravitate through the discharge opening.

References Cited in the file of this patent
UNITED STATES PATENTS

| | | |
|---|---|---|
| 195,893 | Jackson | Oct. 9, 1877 |
| 290,421 | Harnist | Dec. 18, 1883 |
| 397,737 | Marshall | Feb. 12, 1889 |
| 701,385 | Pelton | June 3, 1902 |
| 1,055,311 | Blount | Mar. 11, 1913 |
| 1,177,991 | Chifari | Apr. 4, 1916 |
| 1,485,032 | Janes | Feb. 26, 1924 |
| 1,839,712 | Sturz | Jan. 5, 1932 |
| 2,252,701 | Copeman | Aug. 19, 1941 |
| 2,537,852 | Peterson | Jan. 9, 1951 |
| 2,561,721 | Ardito | July 24, 1951 |